United States Patent
Ito

[11] Patent Number: 6,144,763
[45] Date of Patent: Nov. 7, 2000

[54] METHOD AND APPARATUS FOR COMPRESSION CODING OF IMAGE DATA REPRESENTATIVE OF A COLOR IMAGE AND DIGITAL CAMERA INCLUDING THE SAME

[75] Inventor: Kenji Ito, Asaka, Japan

[73] Assignee: Fuji Photo Film Co., Ltd., Kanagawa, Japan

[21] Appl. No.: 09/040,257

[22] Filed: Mar. 18, 1998

[30] Foreign Application Priority Data

Mar. 24, 1997 [JP] Japan .................................. 9-069788

[51] Int. Cl.[7] ......................................................... G06K 9/00
[52] U.S. Cl. ........................... 382/166; 382/239; 358/539; 348/396
[58] Field of Search .................................... 382/166, 162, 382/167, 239, 232; 358/539, 433, 426–427, 517, 530; 348/391, 393, 396, 664, 251, 256, 478; 386/33, 38, 117, 111, 112, 109

[56] References Cited

U.S. PATENT DOCUMENTS

| | | | |
|---|---|---|---|
| 4,680,624 | 7/1987 | Murakami | 348/256 |
| 5,068,744 | 11/1991 | Ito | 386/33 |
| 5,103,297 | 4/1992 | Yamade | 348/664 |
| 5,126,857 | 6/1992 | Wantanabe et al. | 358/433 |
| 5,184,229 | 2/1993 | Saito et al. | 358/427 |
| 5,301,242 | 4/1994 | Gonzales et al. | 382/239 |
| 5,606,421 | 2/1997 | Suzuki et al. | 386/33 |
| 5,661,576 | 8/1997 | Kaneko | 358/539 |
| 5,689,612 | 11/1997 | Abe | 386/109 |
| 5,729,633 | 3/1998 | Watanabe et al. | 382/239 |
| 5,732,156 | 3/1998 | Watanabe et al. | 382/239 |
| 5,740,303 | 4/1998 | Ban | 386/38 |
| 5,838,822 | 11/1998 | Nobuta | 382/232 |
| 5,949,949 | 9/1999 | Kim | 386/33 |
| 5,960,155 | 9/1999 | Fukuoka et al. | 386/117 |

FOREIGN PATENT DOCUMENTS

| | | | |
|---|---|---|---|
| 2-107094 | 4/1990 | Japan | H04N 9/79 |
| 4-345292 | 12/1992 | Japan | H04N 9/79 |

*Primary Examiner*—Leo H. Boudreau
*Assistant Examiner*—Ishrat Sherali

[57] ABSTRACT

A color image data compression coding apparatus of the present invention includes a signal processing section for processing RGB (Red, Green and Blue) color image data input from an imaging device to thereby output YC (luminance and chrominance) image data consisting of luminance data and chrominance data. When a monochrome mode is set by a system controller, the signal processing section fixes the values of chrominance data to zero. The luminance data and fixed chrominance data are written to a frame memory and then sequentially read out of the memory in blocks component by component. A compression coding section codes the image data red out of the memory by use of a JPEG (Joint Photographic Coding Expert Group) system. As for the coded data of the chrominance data, Huffman codes are assigned only to DC components and EOB codes. As a result, an amount of codes produced by subtracting the amount of codes allocated to the chrominance data from a desired total amount of code is entirely allocated to the luminance data as a target amount of code. After the luminance data have been coded in the target amount, the chrominance data are sequentially coded. A method for implementing the apparatus and a digital camera incorporating the apparatus are also disclosed.

29 Claims, 6 Drawing Sheets

Fig. 3

| | | |
|---|---|---|
| COMPRESSED DATA AREA | SOI | COMPRESSED DATA START |
| | APP1 | INFORMATION ATTACHED TO APPLICATION |
| | DQT | QUANTIZATION TABLE |
| | DHT | HUFFMAN TABLE |
| FRAME SEGMENT | SOF | FRAME HEADER |
| | SOS | SCAN HEADER |
| | | ENTROPY CODED DATA |
| | EOI | ENTROPY CODED DATA END |

Fig. 4

| ADDRESS | CODE | CONTENT |
|---|---|---|
| +000 | FF | MARKER PREFIX |
| +001 | DB | DQT |
| +002 | 00 C5 | FIELD LENGTH 2+(1+64)×3=197B |
| +004 | 00 | Y : Pq=0, Nq=0 |
| +005 | : | QUANTIZATION TABLE Y:Q0 <br> : <br> QUANTIZATION TABLE Y:Q63 |
| +069 | 01 | B-Y : Pq=0, Nq=1 |
| +070 | : | QUANTIZATION TABLE B-Y:Q0 <br> : <br> QUANTIZATION TABLE B-Y:Q63 |
| +134 | 02 | R-Y : Pq=0, Nq=2 |
| +135 | : | QUANTIZATION TABLE R-Y:Q0 <br> : <br> QUANTIZATION TABLE R-Y:Q63 |

Fig. 5

| ADDRESS | CODE | CONTENT |
|---|---|---|
| +000 | FF | MARKER PREFIX |
| +001 | C4 | DHT |
| +002 | 01 A2 | FIELD LENGTH 2+(1+16+12+1+16+162)×2 = 418B |
| +004 | 00 | TABLE NO. Y-DC : 00 |
| +005 | | DHT PARAMETER |
| +033 | 10 | TABLE NO. Y-AC : 10 |
| +034 | | DHT PARAMETER |
| +212 | 01 | TABLE NO. C-DC : 01 |
| +213 | | DHT PARAMETER |
| +241 | 11 | TABLE NO. C-AC : 11 |
| +242 | | DHT PARAMETER |

Fig. 6

| ADDRESS | CODE | CONTENT |
|---|---|---|
| +00 | FF | MARKER PREFIX |
| +01 | C0 | SOF 0 |
| +02 | 00 11 | FIELD LENGTH 2+1+2+2+1+2×3=17B |
| +04 | 08 | DATA ACCURACY (BIT) |
| +05 | XX YY | NUMBER OF VERTICAL LINES XXYY LINES |
| +07 | WW ZZ | NUMBER OF HORIZONTAL PIXELS WWZZ PIXELS |
| +09 | 03 | NUMBER OF COMPONENTS |
| +10 | 01 | COMPONENT NO. |
| +11 | 21 | H0 = 2, V0 = 1 |
| +12 | 00 | QUANTIZATION TABLE DESIGNATION |
| +13 | 02 | COMPONENT NO. |
| +14 | 11 | H1 = 1, V1 = 1 |
| +15 | 01 | QUANTIZATION TABLE DESIGNATION |
| +16 | 03 | COMPONENT NO. |
| +17 | 11 | H2 = 1, V2 = 1 |
| +18 | 01 | QUANTIZATION TABLE DESIGNATION |

Y COMPONENT 1 (rows +10 to +12)
B-Y COMPONENT 2 (rows +13 to +15)
R-Y COMPONENT 3 (rows +16 to +18)

METHOD AND APPARATUS FOR COMPRESSION CODING OF IMAGE DATA REPRESENTATIVE OF A COLOR IMAGE AND DIGITAL CAMERA INCLUDING THE SAME

BACKGROUND OF THE INVENTION

1. Field of the Invention

The present invention relates to a method and an apparatus for the compressing and coding of image data representative of a color image, and a digital camera including the same. More particularly, the present invention relates to an image processing method for compressing and coding image data derived from, e.g., a shot in either one of a color mode and a monochrome mode and then recording them in a recording medium, an apparatus therefor, and a digital camera including the same.

2. Description of the Background Art

A digital still camera, for example, belongs to a family of image processing apparatuses of the type using a CCD (Charge Coupled Device) image sensor or similar solid imaging device and a semiconductor memory, magnetic disk or similar image data recording medium. The digital still camera transforms a color image signal representative of a scene picked up by the image sensor to a digital signal, compresses and codes the transformed image data by bidimensional orthogonal transform or similar transform system, and records the coded image data in the recording medium.

In the digital still camera, color image data produced by, e.g., the block interleaving of luminance data and chrominance data are subjected to bidimensional orthogonal transform and coding. The resulting coded data are compressed and coded to turn out, e.g., a preselected amount of codes and then written to a desired recording medium. For compression coding, use is made of, e.g., a JPEG (Joint Photographic Coding Experts Group) system based on "ISO/IEC DIS 10918-1". The processed image data can not only be printed, but be further processed by a general-purpose personal computer for any desired application.

However, the conventional digital still camera has some problems left unsolved, as follows. The camera has customarily been constructed principally to shoot a natural image or similar subject and output a corresponding color image. The camera therefore cannot output, e.g., line images, characters or monotone or similar monochrome images without resorting to special arrangements. It follows that to record monochrome image data in a recording medium, the recording format or even the construction of the entire camera must be substantially changed.

To record monochrome image data in a recording medium, the CCD imaging sensor or similar imaging device may be implemented by an exclusive imaging device for monochrome. Alternatively, in a monochrome mode, an exclusive color filter for color images may be removed from the front of the imaging device. Further, an exclusive signal processing circuit for monochrome may be additionally built in the camera in order to generate only the luminance component of an image signal and subject it to compression coding.

However, adding an exclusive imaging unit or an exclusive signal processing circuit for monochrome is not practicable without reconstructing the entire camera. Also, image data output by a special compression system dealing only with the luminance component of an image signal cannot be reproduced by a conventional reproducing system. Moreover, a special black-and-white mode must be prepared even for the format for recording the image data. Therefore, the camera, like an exclusive monochrome camera, cannot be compatible with conventional cameras or image data reproducing apparatuses, i.e., it does not allow image data output therefrom to be reproduced by the conventional apparatuses.

Japanese patent laid-open publication No. 107904/1990 assigned to the same assignee as the present application teaches a digital still camera capable of recording, when a black-and-white mode is selected, only original image data relating to a luminance component and subjected to compression coding in both of the luminance component area and chrominance component area of a memory cartridge. This camera, however, does not give full consideration to the compatibility of recorded data. For example, it is difficult with this type of camera to decode recorded data within the range of a standardized basic system and reproduce an image.

As stated above, it is necessary to substantially change the construction of a conventional digital still camera of the type outputting color image data and recording them in a recording medium. This increases the cost and makes it difficult to implement a simple and convenient digital still camera capable of outputting not only a color image but also a monochrome image, as desired. For example, it is difficult to realize a simple and convenient digital still camera adaptive to both of a color image and a monochrome image and outputting image data while insuring compatibility therebetween.

SUMMARY OF THE INVENTION

It is therefore an object of the present invention to provide a method and an apparatus for the compression coding of image data and capable of outputting coded data representative of a monochrome image with a simple configuration while being compatible with a conventional image processing system of the type outputting color image data, and a digital still camera including the same.

In accordance with the present invention, an apparatus for compressing and coding image data representative of a color image and including a luminance component and chrominance components and outputting the resulting coded image data includes a signal processing circuit for processing the image data to thereby output processed image data. A storage stores the processed image data and allows them to be read out in preselected blocks component by component. A compression coding circuit compresses and codes the processed image data read out of the storage component by component to thereby output coded data. An outputting circuit outputs the coded data. A system controller controls a mode for compressing the image data. When a monochrome mode for compressing and coding the image data such that the image data render a monochrome image is selected, the system controller causes the chrominance components of the image data to be fixed to a preselected value, and causes the resulting fixed chrominance components and luminance component to be compressed and coded by the compression coding circuit.

Also, in accordance with the present invention, a method of compressing and coding image data representative of a color image and including a luminance component and chrominance components begins with a step of writing processed image data output from a signal processing circuit in a storage, and reading the processed image data out of the storage in preselected blocks component by component. A compression coding circuit is caused to compress and code the processed image data read out of the storage component by component. Coded data output from the compression coding circuit are output. When a monochrome mode for compressing and coding the image data such that the image data render a monochrome image is selected, the chrominance components of the image data are fixed to a preselected value, and the resulting fixed chrominance components and the luminance component are compressed and coded by the compression coding circuit.

Further, in accordance with the present invention, a digital camera for compressing and coding image data representative of a color image and including a luminance component and chrominance components, and outputting the resulting coded image data, includes a signal processing circuit for processing the image data to thereby output processed image data. A storage stores the processed image data and allows them to be read out in preselected blocks component by component. A compression coding circuit compresses and codes the processed image data read out of the storage component by component to thereby output coded data. An outputting circuit outputs the coded data. A system controller controls a mode for compressing the image data. The system controller causes, when a monochrome mode for compressing and coding the image data such that the image data render a monochrome image is selected, the chrominance components of the image data to be fixed to a preselected value, and causing the resulting fixed chrominance components and luminance component to be compressed and coded by the compression coding circuit. When a command signal for causing the color image to be so compressed and coded as to turn out a monochrome image when reproduced is input on an operation panel, the system controller selects the monochrome mode and fixes the chrominance components of the image data to the preselected value.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENT

Figure 1:
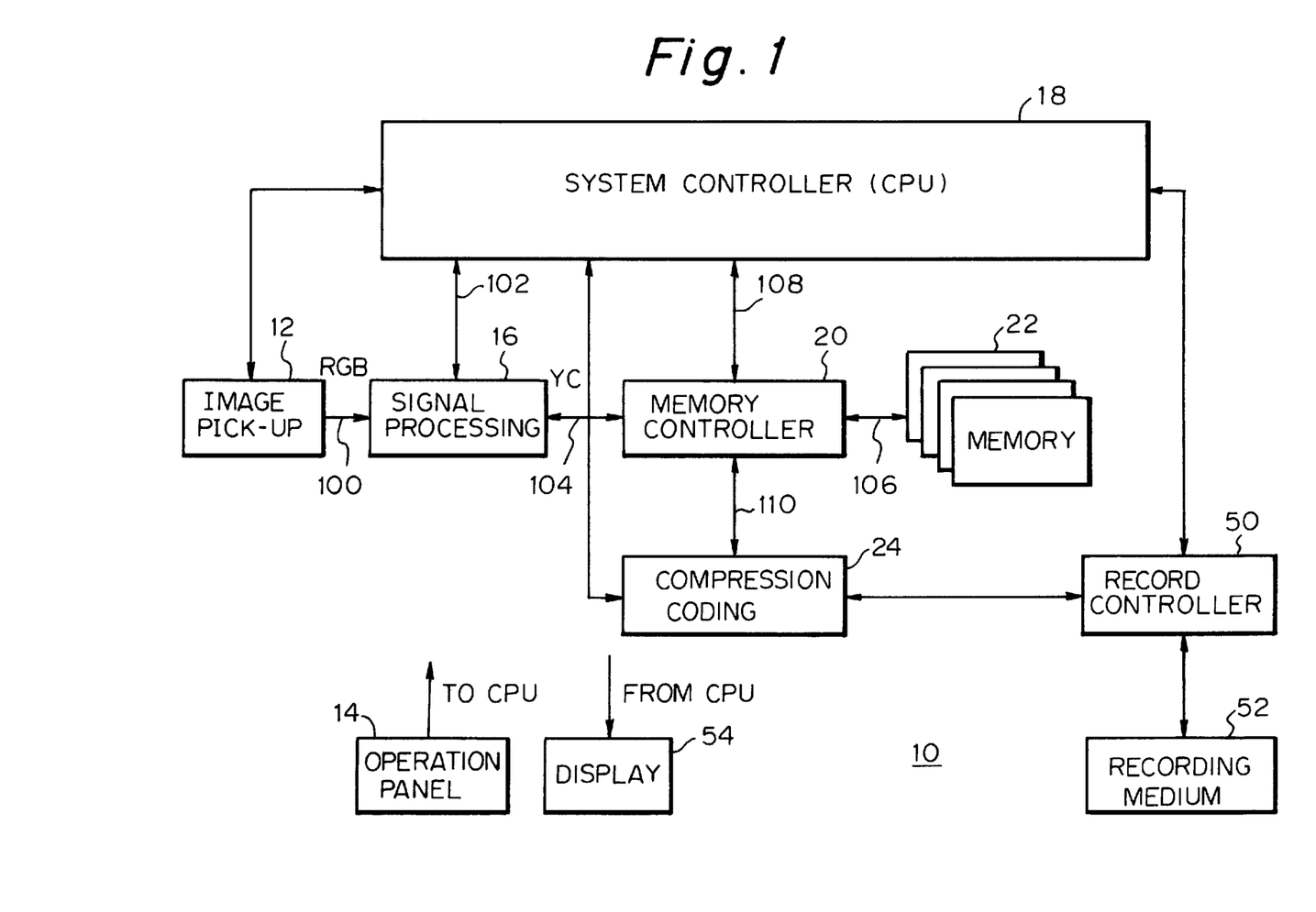
FIG. 1 is a block diagram schematically showing a digital still camera embodying the present invention.

Referring to FIG. 1 of the drawings, a digital still camera embodying the present invention is shown and generally designated by the reference numeral 10. As shown, the camera 10 includes an image pick-up 12 for picking up a desired scene and outputting an image signal representative of the scene. The image signal is transformed to corresponding image data, subjected to compression coding, and then written to a memory card or similar recording medium, as will be described specifically later. The camera 10 compresses and codes the image data by, e.g., the standardized JPEG system mentioned earlier and is selectively operable in a color mode or a monochrome mode. The user of the camera is capable of selecting either the color mode or the monochrome mode on an operation panel 14. The portions of the camera 10 not directly relevant to the understanding of the present invention will not be shown or described. In the following description, signals are represented by the reference numerals designating connection lines on which they appear.

The image pick-up 12 is a unit for picking up a desired scene and outputting an image signal representative of the scene. In the illustrative embodiment, the image pick-up 12 includes an imaging device and a driver for driving it. When a scene incident via a lens, not shown, is focused on the light-sensitive surface of the imaging device, the imaging device outputs a corresponding electric signal. The image pick-up 12 further includes an iris mechanism, an optical zoom mechanism, and an autofocus (AF) mechanism, although not shown specifically. The lens has a macro-function for implementing, e.g., close shots and allows the user to shoot even a color or monochrome printing on which a fine text pattern or graphic pattern is recorded. The AF mechanism is implemented as a range finding and focus adjusting mechanism based on a passive system using visible rays or an active system using infrared rays. Alternatively, use may be made of a contrast detection system for executing control in accordance with the contrast of the image signal output from the imaging device. With such an AF mechanism, the illustrative embodiment is capable of outputting a more clear-cut image.

The imaging device included in the image pick-up 12 is advantageously implemented by a CCD image sensor or similar solid imaging device. The imaging device has several hundred thousands of pixels to one million and several hundred thousands of pixels. An RGB (red, green and blue) color filter is positioned on the light-sensitive surface of the imaging device. In the illustrative embodiment, the imaging device has, e.g., 640 pixels in the horizontal direction (H) and 480 pixels in the vertical direction (V), i.e., about 300,000 valid pixels in total. The pixels are primary color square pixels. The driver, not shown, drives the imaging device with a drive signal so as to cause it to generate an ROB color image signal at the speed of an electronic shutter corresponding to the drive. The ROB color image signal is fed from the image pick-up 12 to a signal processing 16 via a connection line 100.

The signal processing 16 executes various kinds of processing including tonality correction and color correction with the input ROB color image signal and transforms the processed image signal to eight-bit digital values, i.e., ROB color image data. Further, the signal processing 16 converts the RGB color image data to YC (luminance and chrominance) image data constituted by luminance data Y, chrominance data Cr an chrominance data Cb in a ratio of 4:2:2. The chrominance data Cr and Cb are produced by subsampling the RGB color image data in the horizontal direction. With a 3×3 matrix circuit, for example, the signal processing 16 multiplies each of the R, G and B data components by a particular coefficient and adds the resulting products for thereby producing luminance data Y. As for the chrominance data Cr and Cb, the signal processing 16 multiplies each of the R, G and B data components by a particular coefficient and then performs addition and subtraction with the resulting products. If desired, the signal processing 16 may be provided with a digital image processing function for executing analog image signal processing with the input RGB color image signal, digitizing the analog image signal to produce digital RGB image data, and correcting the digital RGB image data.

In the monochrome mode particular to the illustrative embodiment, the signal processing 16 fixes, in response to a control signal 102 fed from a system controller 18, the values of the chrominance data Cr and Cb to the center value "128 (0x80h)" substantially representative of zero with hardware. As a result, luminance data Y corresponding to the RGB color image signal 100 and chrominance data Cr and Cb having the above fixed value appear on the output 104 of the signal processing 16. In the color mode which is usually set up, the signal processing 16 outputs luminance data Y and chrominance data Cr and Cb corresponding to the RGB color image signal 100. In the monochrome mode, the chrominance signals Cr and Cb may, of course, be fixed to any suitable value other than "128". With a value other than "128", it is possible to render a sepia image or similar monochrome image different from a black-and-white image, as desired. The system controller 18 is implemented by a CPU (Central Processing Unit).

Assume that the control signal 102 input to the signal processing 16 is indicative of a high contrast shot in the monochrome mode. Then, the signal processing 16 may compare the value of the luminance data Y with a preselected threshold, fix the value either to a maximum or a minimum luminance level on the basis of the result of comparison, and output the fixed value. The signal processing 16 is capable of executing contour enhancement with the input color image signal, i.e., generating digital image signal having enhanced contours in response to a control signal fed from the controller 18. Further, the signal processing 16 has a digital zooming function for interpolating the pixels of the digital image data to thereby output image data representative of only a desired portion of the image in an enlarged scale.

The output 104 of the signal processing 16 is connected to a memory controller 20. A frame memory or storage 22 is connected to the memory controller 20. The memory controller 20 controls the access to the frame memory 22 for writing or reading image data in or out of the memory 22. The frame memory 22 has storage areas respectively assigned to the luminance data Y, chrominance data Cr and chrominance data Cb constituting at least one frame of image. The frame memory 22 may have a capacity great enough to store image data representative of a plurality of pictures, e.g., a plurality of frames continuously picked up by the image pick-up 12. In such a case, the storage areas of the frame memory 22 should advantageously be extendable.

Further, in response to a control signal fed from the controller 18 via a connection line 108, the memory controller 20 reads each of the luminance data Y and chrominance data Cr and Cb out of the frame memory 22 while dividing them into a plurality of blocks each having 8 (H)×8 (V) pixels. The luminance data Y and chrominance data Cr and Cb so read out by the memory controller 20 component by component are delivered to a compression coding 24 via a connection line 110 component by component.

The compression coding 24 compresses and codes the block-by-block image data 10 read out of the frame memory 22, using a baseline DCT (Discrete Cosine Transform) coding scheme by way of example. The crux is that the compression coding scheme be capable of compressing and coding the luminance data Y and chrominance data Cr and Cb separately and storing each of the coded data in a particular area. In the illustrative embodiment, for a coded data frame particular to the baseline DCT coding scheme, use is made of a noninterleave system in which the coded luminance data Y, chrominance data Cr and chrominance data Cb each is transferred independently of the others, so that a single image is coded component by component.

Figure 2:
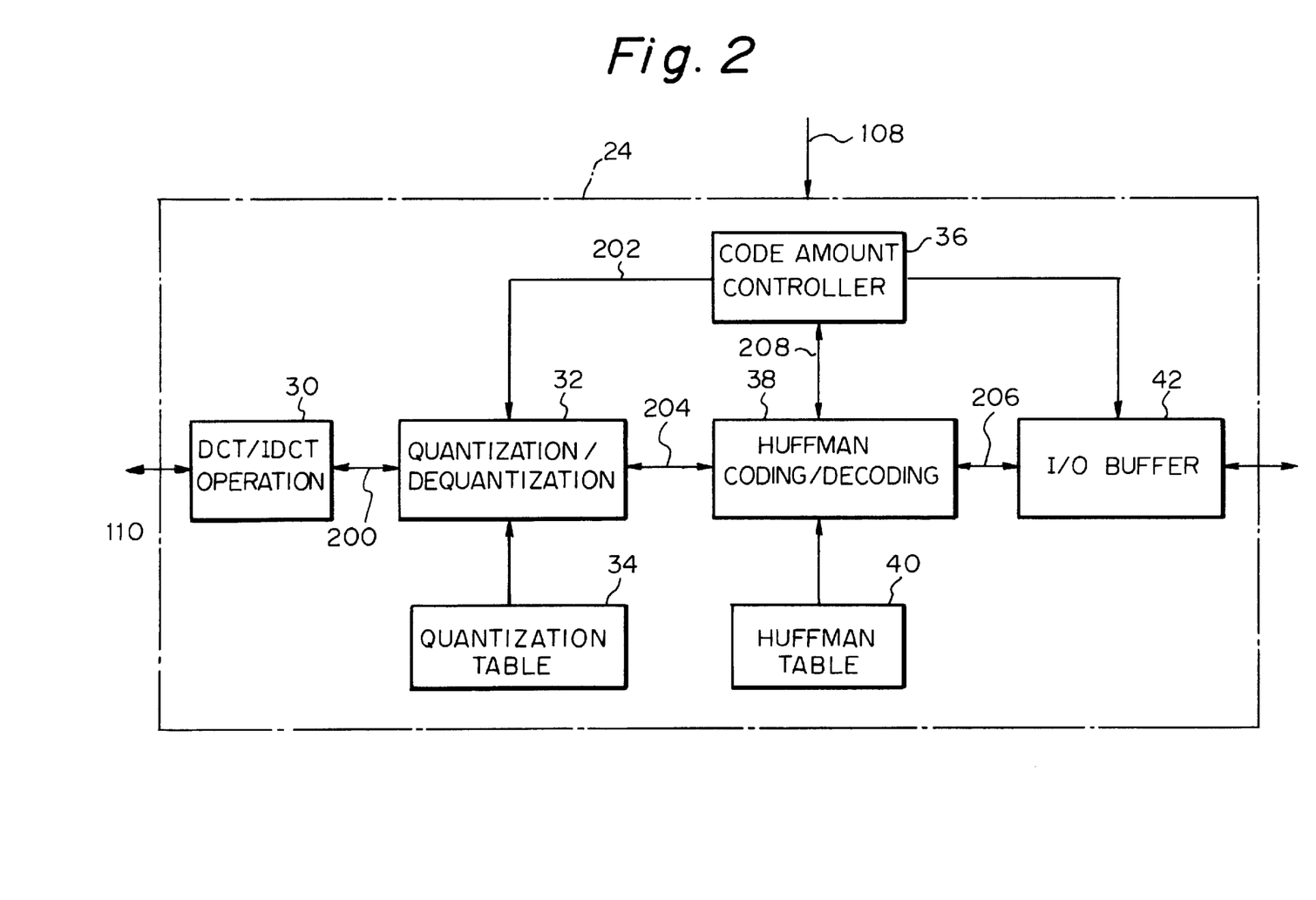
FIG. 2 is a block diagram schematically showing a compression coding section included in the embodiment in detail.

Particularly, in the monochrome mode, the compression coding 24 makes the amount of AC codes to be allocated to the chrominance data Cr and Cb zero. Specifically, as shown in FIG. 2, the compression coding 24 includes a DCT/IDCT (Inverse Discrete Cosine Transform) operation 30 for executing bidimensional orthogonal transform with the block-by-block image data 10. In the illustrative embodiment, bidimensional orthogonal transform is implemented by DCT. The DCTI/DCT operation 30 arranges vertically and horizontally the DC components and AC components of DCT transform coefficients generated by bidimensional orthogonal transform. Subsequently, the operation 30 rearranges the AC components and DC components such that the DC components occupy the top left portion and are sequentially replaced by the high frequency data of the AC components toward the bottom right. The output 200 of the operation 30 is connected to a quantization/dequantization 32.

The quantization/dequantization 32 normalizes the DC components and AC components output from the DCT/IDCT operation 30, using a quantization table 34 listing quantizing steps respectively assigned to the DC components and AC components. Specifically, a code amount controller 36 feeds a control signal 202 to the quantization/dequantization 32 so as to cause it to select an adequate quantization table in accordance with, among others, the characteristic of an input image. The normalized DCT transform coefficients are arranged in blocks and then sequentially scanned zigzag, low frequency AC components being first. The transform coefficients so scanned are sequentially fed to a Huffman coding/decoding 38 via a connection line 204.

The Huffman coding/decoding 38 executes entropy coding with the block-by-block quantized data applied to its input 204. In the illustrative embodiment, the coding/decoding 38 codes the input data by assigning Huffman codes listed in a Huffman table 40 to the input data, as follows. First, the coding/decoding 38 codes an estimated value of the input DC component, i.e., a difference between the DC component value of an input block and that of the immediately preceding block. Subsequently, the coding/decoding 38 codes the AC components scanned zigzag from the low frequency side to the high frequency side. Thereafter, the coding/decoding 38 inserts an EOB (End Of Block) code after a code corresponding to the last valid component, thereby indicating the end of the block. The coding/decoding 38 sequentially performs the above processing with the luminance data Y and chrominance data Cr and Cb. The block-by-block coded data are sequentially fed from the coding/decoding 38 to an I/O (Input/Output) buffer 42 via a connection line 206. Further, in response to a control signal 208 fed from the code amount controller 36, the coding/decoding 38 determines the final valid components by cutting off the data to be coded, e.g., limits the coded data to less than a preselected length inclusive.

The code amount controller 36 controls the amount of the compressed and coded data to a total amount of codes matching with the compression coding accuracy. Specifically, the controller 36 controls the quantization/ dequantization 32, Huffman coding/decoding 38 and I/O buffer 42 such that the data output from the coding/decoding 38 have less than a preselected length inclusive, e.g., a fixed length. Further, the controller 36 controls the amount of codes of the decoded data by a two-path control scheme, i.e., by calculating an activity representative of the characteristic of an image, selecting an adequate quantizing step based on the calculated activity, compressing and coding image data with the quantizing step, and again compressing the image data on the basis of the amount of resulting codes. Alternatively, the controller 36 may use a single path control scheme or any other suitable control scheme, if desired.

Assume that the system controller (CPU) 18 sends mode data indicative of the monochrome mode to the code amount controller 36. Then, the controller 36 controls the Huffman coding/decoding 38 by setting the amount of AC codes which is zero, as mentioned earlier. Specifically, the controller 36 assigns a target code amount of zero to the AC codes of the chrominance data Cr and Cb. As for the luminance data Y, the controller 36 selects as a target amount of codes a value produced by subtracting the amount of DC codes and the amount of EOB codes relating to the chrominance data Cr and Cb from the total amount of codes. The controller 36 sets such two target amounts allocated to the chrominance data and luminance data, respectively, in the Huffman coding/decoding 38.

For example, assume that the number of DC components is zero. Then, on a JPEG default Huffman table, the chrominance data Cr and Cb need two bits for each block and two bits for an EOB code, i.e., four bits multiplied by the number of blocks for all the blocks. Therefore, in the case of the 4:2:2 compression scheme using the 640 (H)×480 (V) pixel matrix, the target amount of codes to be allocated to the chrominance data Cr and Cb is 4,800 bits (2 bits×2,400 blocks) for each of the DC components and EOB codes, i.e., 9,600 bits in total. The illustrative embodiment adds extra sixteen bits to 9,600 bits in consideration of a difference between the actual DC difference and the initial value. As a result, the controller 36 assigns 9,616 bits in total to the entire chrominance data Cr and Cb. Assuming a compression accuracy of 2 bpp (bits per pel or pixel), then the total amount of codes corresponding to image data is 614,400 bits. Therefore, as for the luminance data Y, the controller 36 selects 604,784 bits produced by subtracting 9,626 bits allocated to the chrominance data Cr and Cb from the 614,400-bit total amount of codes as a target amount of codes.

The I/O buffer 42 is a buffer memory for temporarily storing the coded data output from the Huffman coding/decoding 38 under the control of the code amount controller 36 and then delivering them to a record controller 50, FIG. 1, connected to the output of the compression coding 24.

The record controller 50 shown in FIG. 1 controls the recording of the coded data received from the compression coding 24 in a recording medium 52 removably fitted in the camera 10. In the illustrative embodiment, the recording medium 52 may advantageously be implemented by a memory card having a semiconductor memory thereinside. Of course, the memory card may be replaced with an optical disk, magnetic disk or similar rotary recording medium or a magnetic tape, optical or magnetic card or similar sequential recording medium. Further, the recording medium 52 may even be implemented as a device capable of sending the coded data to another information equipment, e.g., an information recording apparatus connectable to the camera 1 via analog and digital paths.

Figure 3:
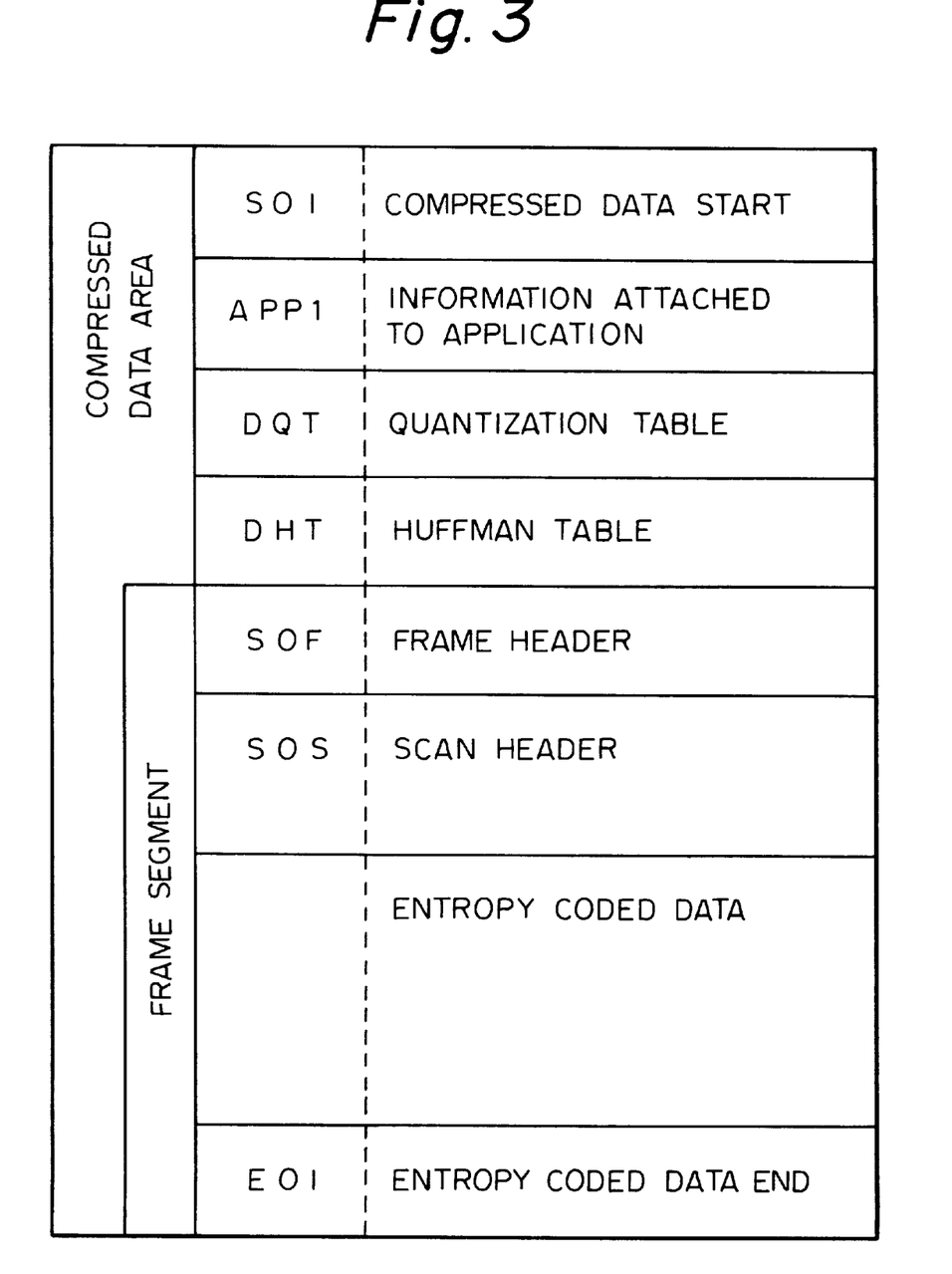
FIG. 3 shows a specific format for recording coded data output in the embodiment in a recording medium.

FIG. 3 shows a format in which data are written to the recording medium 52 in the illustrative embodiment. As shown, the format corresponds to the JPEG baseline DCT format. In the illustrative embodiment, the camera 10 is so constructed as to write the coded data output from the Huffman coding/decoding 38 in the format shown in FIG. 3. The format allows both of the coded data derived from the color mode and the coded data derived from the monochrome mode to be written to the medium 52. The coded data stored in the medium 52 are reproduced by a conventional reproducing apparatus adaptive to the camera 10 and JPEG system.

As shown in FIG. 3, the format basically conforms to "Requirements and Guideline; ISO/IEC DIS 10918-1" of a color still image compression standard (JPEG). Compression coded data constituting a single image are made up of a compressed data start code SOI (Start of Image) heading the format, information APP1 (Reserved for Application Segments) attached to an application, a quantization table DQT (Define Quantization Table), a Huffman coding table DHT (Define Huffman Table), a frame header SOF (Start of Frame), a scan header SOS (Start of Scan), entropy coded data which are actual compressed data, and an entropy coded data end code EOI (End of Image).

The compressed data start code SOI is a marker heading the entire image and showing the beginning of compressed data. The information APP1 attached to an application is a marker code to be freely used by an application. In the illustrative embodiment, the information APP1 may be used to record data not used for recording an image in the monochrome mode, but used for another purpose, e.g., data representative of a reduced version or thumbnail image of the coded data recorded in a frame. This kind of information can be used by an application, as needed.

Figure 4:
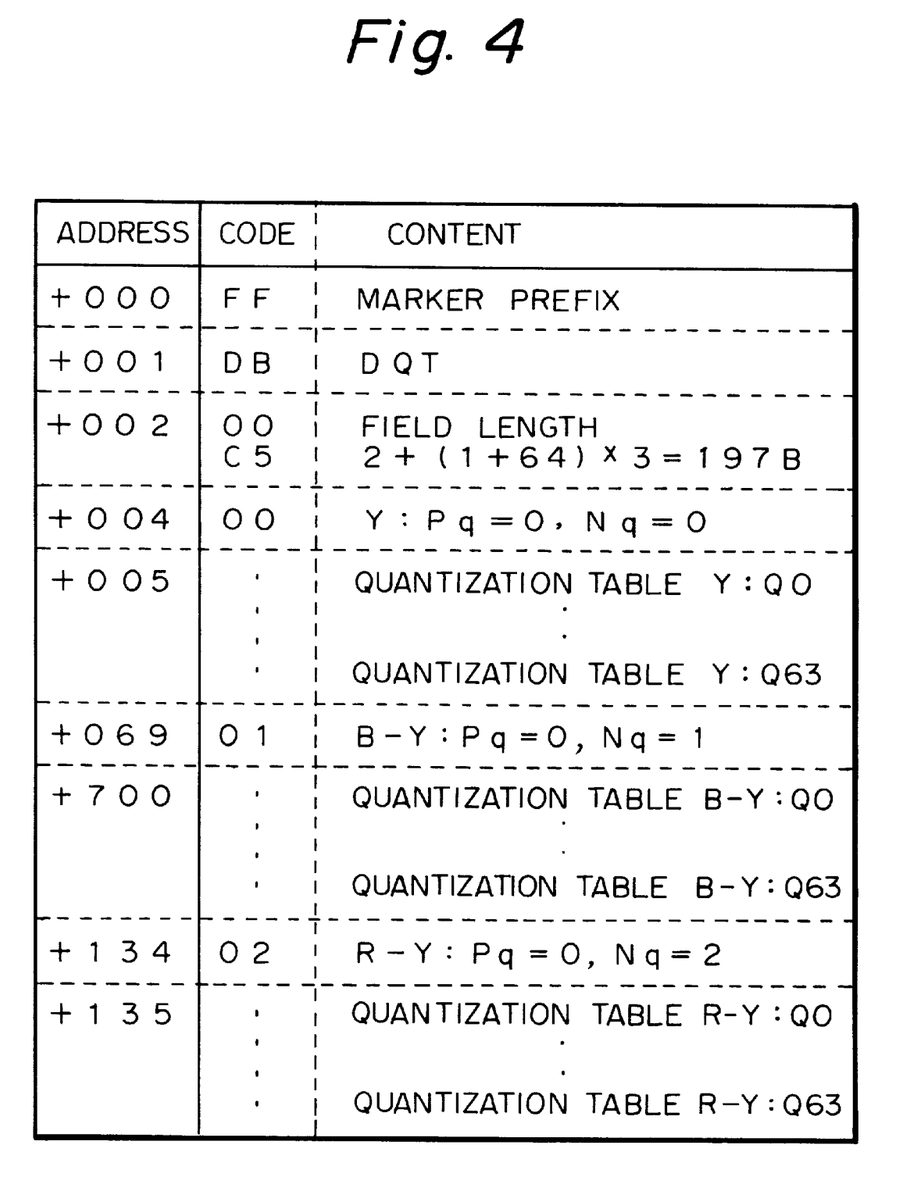
FIG. 4 shows a quantization table included in the format of FIG. 3 in detail.

The quantization table DQT is representative of table numbers, accuracy and step sizes for quantization. As shown in FIG. 4 in detail, the quantization table DQT lists a marker prefix, DQT representative of the definition of the table, a field length representative of a size following DQT, accuracy (Pq=0 (eight bits)) and table numbers (Nq=0, 1, 2), and quantization tables (Y, B-Y and R-Y) for luminance data (Y) and chrominance data B-Y(Cb) and R-Y(Cr).

Figure 5:
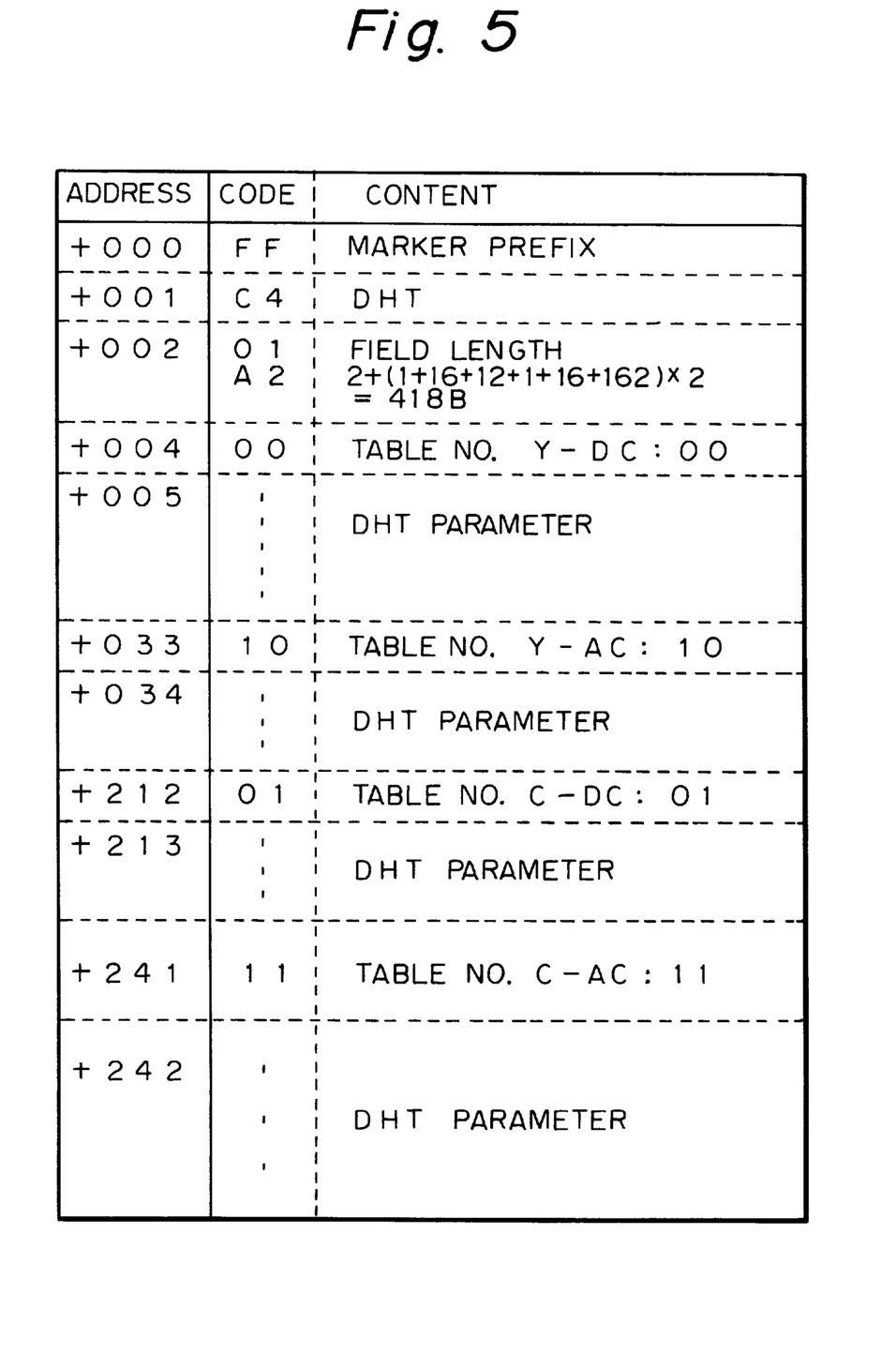
FIG. 5 shows a Huffman table also included in the format of FIG. 3 in detail.

The Huffman coding table DHT lists information relating to Huffman tables, i.e., table numbers, a code length, and code symbols. As shown in FIG. 5 in detail, the table DHT shows a marker prefix, DHT representative of the Huffman table, a field length representative of a size following DHT, table numbers assigned to the DC and AC components of the luminance data and chrominance data, and DHT parameters representative of Huffman code symbols.

Figure 6:
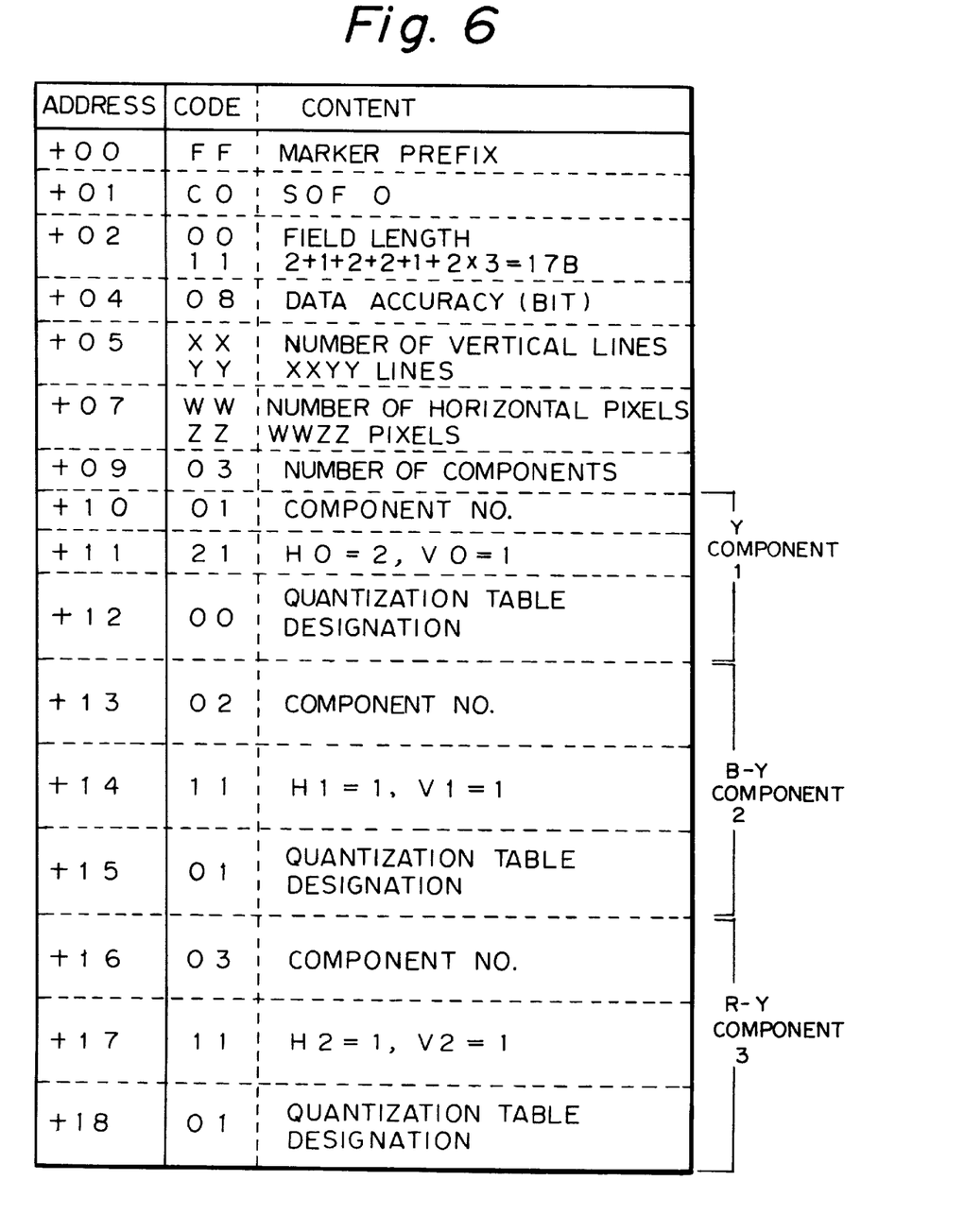
FIG. 6 shows a frame header further included in the format of FIG. 3 in detail.

The frame header SOF is a marker designating a coding algorithm and an entropy coding system and representative of the beginning of a frame. In the illustrative embodiment, the frame header SOF shows $SOF_0$ representative of a baseline DCT frame. As shown in FIG. 6 in detail, the frame header SOF indicates a marker prefix, SOF representative of the frame header, a field length showing a size following the header, the accuracy of data representative of the number of bits for a pixel, the number of vertical lines and the number of horizontal lines representative of the size of an image in combination, and the number of components (three) representative of the number of components constituting a frame. Each component (1 (Y), 2 (B-Y) or 3 (R-Y)) consists of a component number, a horizontal and vertical sampling ratio (H0 and V0, H1 and V1 or H2 and V2), and a quantization table number to be assigned to the component.

The scan header SOS is information representative of a scan head marker. In the illustrative embodiment, the frame segment has three kinds of scanning respectively assigned to luminance and chrominance components; one scan header is assigned to each kind of scanning.

The entropy coded data end code EOI is a marker representative of the end of entropy coded data, i.e., the end of the entire image.

Referring again to FIG. 1, the system controller 18 controls the entire camera 10 and is implemented by a microcomputer or similar processing system. The system controller 18 feeds necessary reference signals to the various constituents of the camera 10. For example, when the system controller 18 is triggered by a release signal received from the operation panel 14, it controls the image pick-up 12, signal processing 16, memory controller 20, and compression coding 24. Further, the system controller 18 controls the writing or reading of data in or out of the recording medium 52 removably mounted to the record controller 50. Particularly, in the illustrative embodiment, the system controller 18 selects either one of the color mode and monochrome mode in accordance with a command input on the operation panel 14, and generates control signals for setting the mode selected in the various sections of the camera 10.

The display 54 outputs various kinds of information meant for the user and including the operation statuses of the camera 10. When the display 54 is implemented by a color LCD (Liquid Crystal Display) panel or similar display device, it may display an image corresponding to image data picked up, if desired.

The operation of the camera 10 having the above construction will be described hereinafter. First, assume that the user of the camera 10 selects the color mode on the operation panel 14. Then, in response to a release command also input on the operation panel 14, the system controller 18 feeds a control signal to the image pick-up 12, commanding it to shoot a scene. On the receipt of the control signal, the image pick-up 12 controls the focus and iris and then controls the electronic shutter so as to generate an image signal representative of the scene. The image signal is subjected to tonality and color correction and then converted to RGB color image data by the signal processing 16. Further, the RGB color data are transformed to YC image data consisting of luminance data Y and chrominance data Cr and Cb and then written to the frame memory 22 under the control of the memory controller 20.

After image data representative of one frame have been written to the frame memory 22, luminance data Y included in the image data are sequentially read out in 8×8 pixel blocks and fed to the compression coding 24. Subsequently, chrominance data Cr and Cb also included in the above image data are sequentially read out of the frame memory 22 in blocks and also fed to the compression and coding 24. In the compressing coding 24, the DCT/IDCT operation 30 executes DCT with the luminance data Y block by block, rearranges the resulting DC components and AC components, and outputs the rearranged two kinds of components. Thereafter, the DCT/IDCT operation 30 executes DCT with the chrominance data Cr and Cb block by block, rearranges the resulting DC components and AC components, and outputs the rearranged components.

The quantization/dequantization 32 receives the DC components and AC components from the DCT/IDCT operation 30 and normalizes each of them by using a particular quantizing step stored in the quantization table. The transform coefficients of each normalized component are arranged in blocks and then scanned zigzag, the DC components being first, while being sequentially output. After the DC components, the AC components are scanned in the ascending order with respect to frequency.

The Huffman coding/decoding 38 codes each transform coefficient output from the quantization/dequantization 32 by assigning a particular Huffman code listed in the Huffman table thereto. Specifically, as for the first block of DC components belonging to each of the luminance data Y and chrominance data Cr and Cb, the coding/decoding 38 directly codes their values. As for the subsequent blocks of DC components, the coding/decoding 38 codes a difference between the value of each DC component and that of the DC component of the immediately preceding block to thereby output an estimated value. The coding/decoding 38 sequentially scans the AC components of each component zigzag in the ascending order with respect to frequency. At this instant, the code amount controller 36 causes the coding/decoding 38 to end coding as soon as it codes the last valid component. The coding/decoding 38 outputs the sequence of coded data of each component after adding the EOB code to the end of the sequence.

The coded data output from the Huffman coding/decoding 38 are once stored in the I/O buffer 42 and then fed to the record controller 50 connected to the compression coding 24. The record controller 50 arranges the input coded data in a format matching with the recording medium 52, and then writes them in the medium 52.

As stated above, in the color mode which is usually selected, a full-color image identical with a desired scene is recorded in the recording medium 52. The coded data stored in the medium 52 by the above procedure may be read out and reproduced by the camera 10. For example, the compression coding 24 receives via the I/O buffer 42 the coded data read out of the medium 52 by the record controller 50. In the compression coding 24, the Huffman coding/decoding 38 decodes the received coded data, and the quantization/dequantization 32 dequantizes the resulting decoded data. Subsequently, the DCT/IDCT operation 30 executes IDCT with the data output from the dequantization 32. The decoded image data output from the decoding 38 are once written to the frame memory 22 via the memory controller 20 and then fed to the display 54, so that the user can see an image represented by the above image data on the display 54.

Now, assume that the user selects the monochrome mode on the operation panel 14. Then, in response to a release command also input on the operation panel 14, an image signal output from the image pick-up 12 is fed to the signal processing 16, as during the color mode operation. The signal processing 16 executes tonality and color correction with the input image signal and coverts the corrected image signal to digital values. When the controller 18 delivers the control signal 102 commanding contour enhancement to the signal processing 16, the signal processing 16 enhances the contours of the image signal before digitizing the signal.

Further, the signal processing 16 produces luminance data Y and chrominance data Cr and Cb from the digital RGB data by calculation. The luminance data Y are directly written to the frame memory 22 via the memory controller 20. The chrominance data Cr and Cb are fixed to "128" without exception and then written to the frame memory 22 via the memory controller 20.

The luminance data Y and chrominance data Cr and Cb stored in the frame memory 22 by the above procedure are sequentially read out component by component, as during the color mode operation. A control signal indicative of the monochrome mode is fed from the system controller 18 to the compression coding 24. In response, the code amount controller 36 calculates an amount of codes to be allocated to the luminance data Y. For example, in the illustrative embodiment, the controller 36 subtracts the amount of DC codes and that of EOB codes allocated to the chrominance data Cr and Cb from the total amount of codes determined by the accuracy of compression coding, as stated earlier. The controller 36 determines the resulting difference to be the target amount of codes to be allocated to the luminance data Y, and sets it in the Huffman coding/decoding 38.

The DCT/IDCT operation 30 executes DCT with the luminance data Y block by block, rearranges the DC components and AC components of the resulting transform coefficients, and delivers the rearranged DC components and DC components to the quantization/dequantization 32. The quantization/dequantization 32 normalizes the transform coefficients by using a quantizing step assigned to the luminance data Y. The normalized transform coefficients are arranged in blocks and then scanned zigzag, the DC components being first, while being sequentially output. After the DC components, the AC components are scanned in the ascending order with respect to frequency.

The Huffman coding/decoding 38 codes each transform coefficient output from the quantization/dequantization 32 by assigning a particular Huffman code listed in the Huffman table thereto. Specifically, as for the first block of DC components, the coding/decoding 38 codes the values of the DC components. As for the subsequent blocks of DC components, the coding/decoding 38 codes a difference between the value of each DC component and that of the DC component of the immediately preceding block to thereby output an estimated value. The coding/decoding 38 sequentially scans the AC components of each component zigzag in the ascending order with respect to frequency. At this instant, the code amount controller 36 causes the coding/decoding 38 to end coding on the basis of the target amount of codes set by the code amount controller 36. The coding/decoding 38 outputs the sequence of coded data after adding the EOB code to the end of the sequence.

Subsequently, the chrominance data Cr are read out of the frame memory 22 block by block while being input to the compression coding 24. The chrominance data Cr with the fixed value "128" are subjected to DCT by the DCT/IDCT operation 30 and then normalized by the quantization/dequantization 32. The resulting transform coefficients output from the quantization/dequantization 32 are input to the Huffman coding/decoding 38.

The coding/decoding 38 outputs the block-by-block transform coefficients while assigning Huffman codes to the DC components included in the transform coefficients. Specifically, the coding/decoding 38 assigns Huffman codes to the DC components of the first block. As for the subsequent blocks, the coding/decoding 38 assigns a Huffman code to a difference between each DC component and the DC component of the first block. Because the above difference is the same throughout all the blocks following the first block, i.e., the DC different is zero, the coding/decoding 38 assigns a two-bit Huffman code to such blocks in accordance with the Huffman table. On the other hand, the coding/decoding 38 does not assign any Huffman code to the AC components of the chrominance data Cr because the amount of codes to be allocated to the AC components is zero, as determined by the code amount controller 36. Instead, the coding/decoding 38 adds a two-bit EOB code to the end of each block of DC components provided with Huffman codes and thereby codes the chrominance data Cr. The coded data representative of the chrominance data Cr are written to the preselected area of the recording medium 52 via the I/O buffer 42 and record controller 50. Thereafter, the chrominance data Cb, like the chrominance data Cr, are read out of the frame memory 22, compressed and coded, and then written to the recording medium 52.

As stated above, in the monochrome mode, coded image data representative of a monochrome image corresponding to a desired scene are written to the recording medium 52 in the format of a color image. It follows that the coded image data can be read out of the medium 52 and reproduced on the camera 10 in the same manner as the coded image data generated in the color mode. The difference is that the image to appear on, e.g., the color LCD panel or similar display 54 is monochrome because the chrominance data Cr and Cb are fixed to zero.

In the above embodiment, the signal processing 16 is assumed to fix the chrominance data Cr and Cb to "128" substantially representative of zero. Alternatively, the quantization/dequantization 32 may be so constructed as to quantize the AC components of the chrominance data to zero and normalize them. This alternative scheme is particularly desirable when the signal processing 16 is not capable of fixing the chrominance data to any particular value. As for the control over the amount of codes, a target amount of codes may be set, as in the illustrative embodiment.

In the illustrative embodiment, even in the monochrome mode, coded data are written to the recording medium 52 in the form of a color image. However, only DC components and EOB codes are actually assigned to chrominance data, i.e., only the minimum necessary codes to implement a color image are recorded in the medium 52. Such data can therefore be reproduced in the same manner as a color image, and in addition even a black-and-white or similar monochrome image can be reproduced.

The embodiment is therefore capable of outputting a monochrome image with a compression coding system customarily installed in an electronic still camera only if its parameters are changed. Particularly, in the monochrome mode, the amount of codes to be allocated to the chrominance data can be allocated to the luminance component, enhancing image quality for a given total amount of codes.

The illustrative embodiment has concentrated on a digital still camera selectively operable in a color mode or a monochrome mode. The present invention is similarly applicable to, e.g., a compression coding device having a color and a monochrome compression coding mode, or a recording device having a color mode and a monochrome mode and capable of recording image data after compressing and coding them.

While the compression of a still image has been shown and described as being implemented by the JPEG system, the present invention is applicable even to, e.g., a moving picture compression system which codes a plurality of consecutive frames at a time by compression. Further, the illustrative embodiment is advantageously applicable to a full-color image data format, e.g., Exif (Exchangable image file format).

The present invention is practicable without regard to the control over the amount of codes. For example, the present invention is applicable to a two-path code amount control system having a first and a second step. In the first step, the system calculates an activity representative of the characteristic of an image, determines a quantizing step by feeding the calculated activity forward, and compresses image data with the quantizing step. In the second step, the system corrects and updates the quantizing step on the basis of the amount of codes by feedback processing and again compresses the image data with the corrected quantizing step. In this manner, the present invention is applicable to both of the feed forward system and feedback system.

The embodiment shown and described directly compresses and codes luminance data Y. Alternatively, the signal processing 16 may be so constructed as to transform the luminance data Y to the bilevel data taking either of the maximum and minimum levels with respect to a preselected threshold, and compress the bilevel luminance data and the fixed chrominance data. With this alternative configuration, it is possible to generate coded data representative of a more clear-cut bilevel image despite the color image outputting and recording system.

In summary, in accordance with the present invention, coded data having a color image format, but which will turn out a monochrome image when reproduced, are achievable with a simple construction which changes the values of chrominance components of color image data, fixes them to a preselected value, and then executes compression coding. Because a minimum amount of codes should be allocated to the chrominance components, the remaining amount of codes can be fully allocated to a luminance component. Therefore, in a monochrome mode, high resolution coded data clearly rendering a high definition image with monotone can be output for the same amount of codes as in a color mode as an entire image. The coded data so output can be reproduced in the same manner as data representative of a usual color image, so that compatibility and general-purpose application of coded data are guaranteed. Moreover, control over the amount of codes is practicable without resorting to sophisticated processing. That is, the total amount of codes of coded data can be controlled below desired one in the same manner as when a usual color image is compressed and coded.

The entire disclosure of Japanese patent application No. 69788/1997 filed on Mar. 24, 1997 including the specification, claims, accompanying drawings and abstract of the disclosure is incorporated herein by reference in its entirety.

While the present invention has been described with reference to the particular illustrative embodiment, it is not to be restricted by those embodiment. It is to be appreciated that those skilled in the art can change or modify the embodiment without departing from the scope and spirit of the present invention.

What is claimed is:

1. An apparatus for compressing and coding image data representative of a color image and including a luminance component and chrominance components, and outputting resulting coded image data, said apparatus comprising:

a signal processing circuit for processing the image data to output processed image data;

a storage for storing the processed image data and allowing the processed image data to be read out in preselected blocks component by component;

a compression coding circuit for compressing and coding the processed image data read out of said storage component by component to output coded data;

an outputting circuit for outputting the coded data; and a system controller for controlling said compression coding circuit in accordance with a mode for compressing the image data;

said system controller being operative in response to a monochrome mode selected for compressing and coding the image data such that the image data render a monochrome image to fix the chrominance components of the image data to a single, fixed value, and control said compression coding circuit to compress and code resulting fixed chrominance components and the luminance component.

2. An apparatus in accordance with claim 1, wherein said signal processing circuit transforms an RGB color image signal input thereto to the image data including the luminance component and the chrominance components, and fixes the chrominance components to the fixed value when the monochrome mode is selected.

3. An apparatus in accordance with claim 2, further comprising a signal generating circuit for generating the RGB color image signal.

4. An apparatus in accordance with claim 3, wherein said signal generating circuit includes an imaging device for shooting a scene and generating an image signal representative of the scene, said imaging device comprising an RGB color filter arranged on a light-sensitive surface thereof.

5. An apparatus in accordance with claim 1, wherein said outputting circuit includes a recording device for recording the coded data output from said compression coding circuit in a recording medium, the coded data being recorded in the recording medium in a preselected format.

6. An apparatus in accordance with claim 5, wherein the recording medium comprises a memory card having a semiconductor memory therein, said outputting circuit writing the coded data in the memory card.

7. An apparatus in accordance with claim 1, wherein said compression coding circuit comprises:

an orthogonal transforming circuit for executing orthogonal transform with the image data read out of said storage to thereby output corresponding transform coefficients;

a quantizing circuit for normalizing the transform coefficients to thereby output normalized transform coefficients; and a coding circuit for assigning preselected codes to the normalized transform coefficients.

8. An apparatus in accordance with claim 7, wherein said quantizing circuit quantizes, among the transform coefficients read out of said storage and subjected to orthogonal transform, AC components of the chrominance components to all zero in each block.

9. An apparatus in accordance with claim 7, wherein said compression coding circuit includes a code amount controller for limiting a length of the data to be coded to less than a preselected length inclusive.

10. An apparatus in accordance with claim 9, wherein said code amount controller subtracts an amount of codes which the fixed chrominance components will have when compressed and coded from a total amount of codes having the preselected length, sets a resulting difference as a target amount of codes to be allocated to the luminance component, and limits the amount of codes of the luminance component to less than the target amount of codes inclusive.

11. An apparatus in accordance with claim 1, wherein said compression coding circuit executes compression coding based on a JPEG system.

12. A method of compressing and coding image data representative of a color image and including a luminance component and chrominance components, said method comprising the steps of:

(a) writing processed image data output from a signal processing circuit in a storage, and reading the processed image data out of said storage in preselected blocks component by component;

(b) causing a compression coding circuit to compress and code the processed image data read out of said storage component by component;

(c) outputting coded data output from said compression coding circuit;

(c1) selecting a monochrome mode for compressing and coding the image data such that the image data render a monochrome image;

(c2) fixing the chrominance components of said image data to a single, fixed value; and (c3) controlling said compression coding circuit to compress and code resulting fixed chrominance components and the luminance component.

13. A method in accordance with claim 12, further comprising (d) causing said signal processing circuit to fix, among the image data, the chrominance components to the fixed value, step (a) comprising (e) writing the luminance component processed by step (d) and the chrominance components fixed to the fixed value in said storage, and reading the luminance components and the chrominance components out of the said storage in blocks component by component.

14. A method in accordance with claim 12, wherein step (c) comprises (f) recording the coded data in a recording medium in a preselected format.

15. A method in accordance with claim 12, wherein step (b) comprises:

(g) executing orthogonal transform with the image data read out of said storage to thereby output transform coefficients;

(h) quantizing the transform coefficients to thereby output normalized transform coefficients; and (i) assigning preselected codes to the normalized transform coefficients.

16. A method in accordance with claim 15, wherein step (h) comprises (j) quantizing, among the transform coefficients read out of said storage and subjected to orthogonal transform, AC components of the chrominance components to all zero in each block.

17. A method in accordance with claim 15, further comprising (k) limiting the data to be compressed and coded to less than a preselected length inclusive.

18. A method in accordance with claim 17, wherein step (k) comprises (1) subtracting an amount of codes which the fixed chrominance components will have when compressed and coded from a total amount of codes having the preselected length, setting a resulting difference as a target amount of codes to be allocated to the luminance component, and limiting the amount of codes of the luminance component to less than the target amount of codes inclusive.

19. A digital camera for compressing and coding image data representative of a color image and including a luminance component and chrominance components, and outputting resulting coded image data, said camera comprising:

a signal processing circuit for processing the image data to output processed image data;

a storage for storing the processed image data and allowing the processed image data to be read out in preselected blocks component by component;

a compression coding circuit for compressing and coding the processed image data read out of said storage component by component to output coded data;

an outputting circuit for outputting the coded data; and a system controller for controlling said compression coding circuit in accordance with a mode for compressing the image data;

said system controller being operative in response to a monochrome mode selected for compressing and coding the image data such that the image data render a monochrome image to fix the chrominance components of the image data to a single, fixed value, and control said compression coding circuit to compress and code resulting fixed chrominance components and the luminance component;

said system controller also being operative in response to a command signal for causing the color image to be so compressed and coded as to turn out a monochrome image when reproduced being input on an operation panel to select the monochrome mode, and fix the chrominance components of the image data to the fixed value.

20. A camera in accordance with claim 19, wherein said signal processing circuit transforms an RGB color image signal input thereto to the image data including the luminance component and the chrominance components, and fixes the chrominance components to the fixed value when the monochrome mode is selected.

21. A camera in accordance with claim 20, further comprising a signal generating circuit for generating the RGB color image signal.

22. A camera in accordance with claim 21, wherein said signal generating circuit includes an imaging device for shooting a scene and generating an image signal representative of the scene, said imaging device comprising an RGB color filter arranged on a light-sensitive surface thereof.

23. A camera in accordance with claim 19, wherein said outputting circuit includes a recording device for recording the coded data output from said compression coding circuit in a recording medium, the coded data being recorded in the recording medium in a preselected format.

24. A camera in accordance with claim 23, wherein the recording medium comprises a memory card having a semiconductor memory therein, said outputting circuit writing the coded data in the memory card.

25. A camera in accordance with claim 19, wherein said compression coding circuit comprises:

an orthogonal transforming circuit for executing orthogonal transform with the image data read out of said storage to thereby output corresponding transform coefficients;

a quantizing circuit for normalizing the transform coefficients to thereby output normalized transform coefficients; and a coding circuit for assigning preselected codes to the normalized transform coefficients.

26. A camera in accordance with claim 25, wherein said quantizing circuit quantizes, among the transform coefficients read out of said storage and subjected to orthogonal transform, AC components of the chrominance components to all zero in each block.

27. A camera in accordance with claim 25, wherein said compression coding circuit includes a code amount controller for limiting a length of the data to be coded to less than a preselected length inclusive.

28. A camera in accordance with claim 27, wherein said code amount controller subtracts an amount of codes which the fixed chrominance components will have when compressed and coded from a total amount of codes having the preselected length, sets a resulting difference as a target amount of codes to be allocated to the luminance component, and limits the amount of codes of the luminance component to less than the target amount of codes inclusive.

29. A camera in accordance with claim 19, wherein said compression coding circuit executes compression coding based on a JPEG system.

* * * * *